(12) United States Patent
Brandman

(10) Patent No.: US 6,493,668 B1
(45) Date of Patent: Dec. 10, 2002

(54) SPEECH FEATURE EXTRACTION SYSTEM

(76) Inventor: Yigal Brandman, 4120 Donald Dr., Palo Alto, CA (US) 94306

(\*) Notice: Subject to any disclaimer, the term of this patent is extended or adjusted under 35 U.S.C. 154(b) by 27 days.

(21) Appl. No.: 09/882,744

(22) Filed: Jun. 15, 2001

(51) Int. Cl.[7] ................................. G10L 15/02
(52) U.S. Cl. .................. 704/243; 704/205; 704/206; 708/300
(58) Field of Search ................. 704/205, 231, 704/243, 268, 206; 708/300–323; 370/484; 375/285

(56) References Cited

U.S. PATENT DOCUMENTS

| | | | | |
|---|---|---|---|---|
| 4,221,934 A | \* | 9/1980 | Schiff | 370/484 |
| 4,300,229 A | \* | 11/1981 | Hirosaki | 370/484 |
| 4,660,216 A | \* | 4/1987 | Claasen et al. | 708/319 |
| 4,729,112 A | \* | 3/1988 | Millar | 708/300 |

OTHER PUBLICATIONS

Jelinek, Frederick, "Hidden Markov Models," *Statistical Methods for Speech Recognition*, Chapter 2, The MIT Press: pp. 15–37 (1997).

Quinnell, Richard A., "Speech Recognition: No Longer a Dream, But Still a Challenge," *EDN Magazine*: pp. 41–46 (Jan. 19, 1995).

\* cited by examiner

*Primary Examiner*—David D. Knepper
(74) *Attorney, Agent, or Firm*—Fish & Neave; Nicola A. Pisano; Vinay V. Joshi

(57) ABSTRACT

A system suitable for use in a speech recognition system or other voice processing system extracts features related to the frequency and amplitude characteristics of an input speech signal using a plurality of complex band pass filters by processing the outputs of adjacent bandpass filters.

22 Claims, 3 Drawing Sheets

SPEECH FEATURE EXTRACTION SYSTEM

BACKGROUND OF THE INVENTION

This invention relates to a speech feature extraction system for use in a speech recognition, voice identification, voice authentication systems. More specifically, this invention relates to a speech feature extraction that can be used to create a speech recognition system or other speech processing with a reduced error rate.

Generally, a speech recognition system is an apparatus that attempts to identify spoken words by analyzing the speaker's voice signal. Speech is converted into an electronic form from which features are extracted. The system then attempts to match a sequence of features to previously stored sequence of models associated with known speech units. When a sequence of features matches a sequence of models in accordance with specified rules, the corresponding words are deemed to be recognized by the speech recognition system.

However, background sounds such as radios, car noise, other nearby speakers can make it difficult to extract useful features from the speech. In addition, ambient conditions, such as the use of a different microphones or telephone handsets, a different telephone line, the speaker's distance from the microphone interfere with system performance. Differences between speakers, changes in speaker intonation or emphasis, and even the speakers health can also adversely impact system performance. For a further description of some of these problems, see Richard A. Quinnell, "Speech Recognition: No Longer a Dream, But Still a Challenge," EDN Magazine, Jan. 19, 1995, p. 41–46.

In most speech recognition systems, the speech features are extracted by cepstral analysis, which generally involves measuring the energy in specific frequency bands. The product of that analysis reflects the amplitude of the signal in those bands. Analysis of these amplitude changes over successive time periods can be modeled as an amplitude modulated signal.

Whereas the human ear is a sensitive to frequency modulation as well as amplitude modulation in received speech signals, this frequency modulated content is only partially reflected in systems that perform cepstral analysis.

Accordingly, it would be desirable to provide a speech feature extraction system capable of capturing the frequency modulation characteristics of speech, as well as previously known amplitude modulation characteristics.

It also would be desirable to provide speech recognition and other speech processing systems that incorporate feature extraction systems that provide information on frequency modulation characteristics of the input speech signal.

SUMMARY OF THE INVENTION

In view of the foregoing, it is an object of the present invention to provide a speech feature extraction system capable of capturing the frequency modulation characteristics of speech, as well as previously known amplitude modulation characteristics.

It also is an object of this invention to provide speech recognition and other speech processing systems that incorporate feature extraction systems that provide information on frequency modulation characteristics of the input speech signal.

The present invention provides a speech feature extraction system that reflects frequency modulation characteristics of speech as well as amplitude characteristics. This is done by a feature extraction stage that included a plurality of complex band pass filters in adjacent frequency bands. The output of alternate complex band pass filters is multiplied by the conjugate of the output of the bandpass filter in the adjacent lower frequency band and the resulting signal is low pass filtered.

Each of the low pass filter outputs is processed to compute two components: a FM component that is substantially sensitive to the frequency of the signal passed by the adjacent bandpass filters from which the low pass filter output was generated, and an AM component that is substantially sensitive to the amplitude of the signal passed by the adjacent bandpass filters. The FM component reflects the difference in the phase of the outputs of the adjacent bandpass filters used to generate the lowpass filter output.

The AM and FM components are then processed using known feature enhancement techniques, such as discrete cosine transform, melscale translation, mean normalization, delta and acceleration analysis, linear discriminant analysis and principal component analysis, to generate speech features suitable for statistical processing or other recognition or identification methods.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
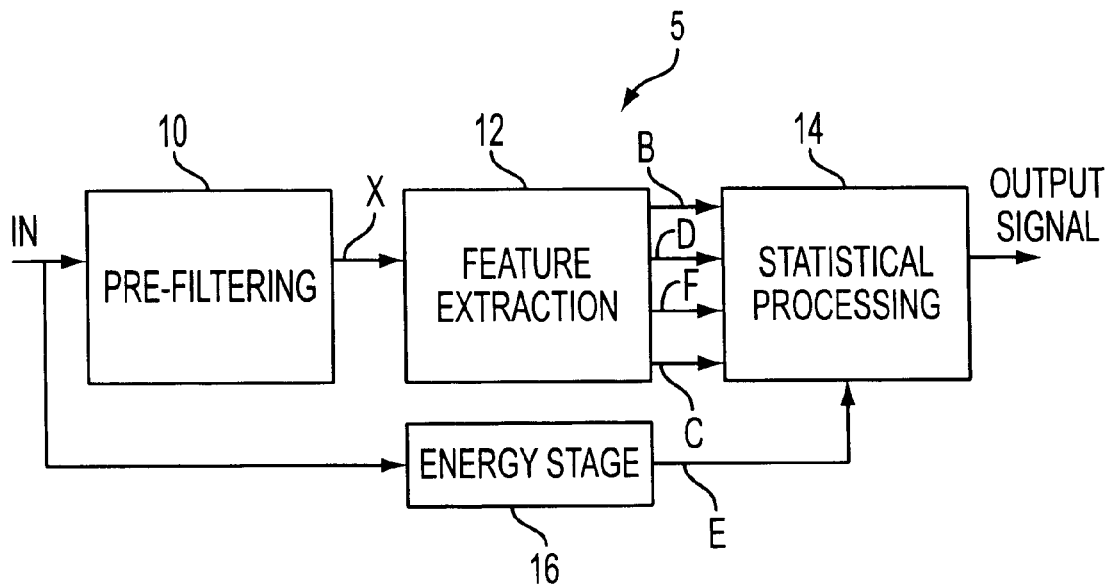
FIG. 1 is a block diagram of an illustrative speech recognition system incorporating the speech feature extraction system of the present invention.

Referring to FIG. 1, a generalized depiction of illustrative speech recognition system 5 is described that incorporates the speech extraction system of the present invention. As will be apparent to one of ordinary skill in the art, the speech feature extraction system of the present invention also may be used in speaker identification, authentication and other voice processing systems.

System 5 illustratively includes four stages: pre-filtering stage 10, feature extraction stage 12, statistical processing stage 14, and energy stage 16. Pre-filtering stage 10, statistical processing stage 14 and energy stage 16 employ speech processing techniques known in the art and do not form part of the present invention. Feature extraction stage 12 incorporates the speech feature extraction system of the present invention, and further includes feature enhancement techniques which are known in the art, as described hereinafter.

Audio speech signal is converted into an electrical signal by a microphone, telephone receiver or other device, and provided as an input speech signal to system 5. In a preferred embodiment of the present invention, the electrical signal is sampled or digitized to provide a digital signal (IN) representative of the audio speech. Pre-filtering stage 10 amplifies the high frequency components of audio signal IN, and the prefiltered signal is then provided to feature extraction stage 12.

Feature extraction stage 12 processes prefiltered signal X to generate a sequence of feature vectors related to characteristics of input signal IN that may be useful for speech recognition. The output of feature extraction stage 12 is used by statistical processing stage 14 which compares the sequence of feature vectors to predefined statistical models to identify words or other speech units in the input signal IN. The feature vectors are compared to the models using known techniques, such as the Hidden Markov Model (HMM) described in Jelinek, "Statistical Methods for Speech Recognition," The MIT Press, 1997, pp. 15–37. The output of statistical processing stage 14 is the recognized word, or other suitable output depending upon the specific application.

Statistical processing at stage 14 may be performed locally, or at a remote location relative to where the processing of stages 10, 12, and 16 are performed. For example, the sequence of feature vectors may be transmitted to a remote server for statistical processing.

The illustrative speech recognition system of FIG. 1 preferably also includes energy stage 16 which provides an output signal indicative of the total energy in a frame of input signal IN. Statistical processing stage 14 may use this total energy information to provide improved recognition of speech contained in the input signal.

Figure 2:
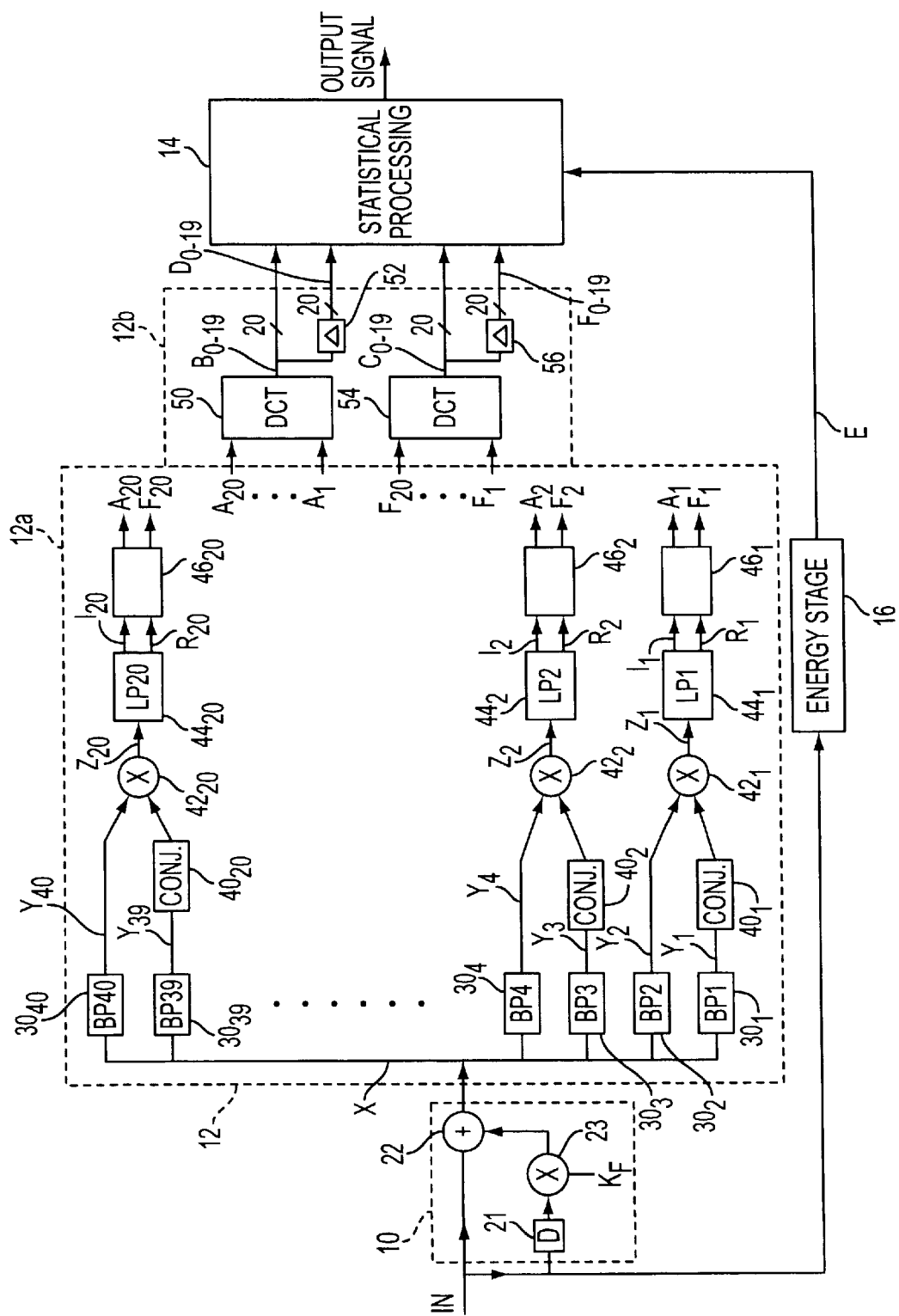
FIG. 2 is a detailed block diagram of the speech recognition system of FIG. 1.

Referring now to FIG. 2, pre-filtering stage 10 and feature extraction stage 12 are described in greater detail. Pre-filtering stage 10 is a high pass filter that amplifies high frequency components of the input signal. Pre-filtering stage 10 comprises one-sample delay element 21, multiplier 23 and adder 24. Multiplier 23 multiplies the one-sample delayed signal by constant Kf, which typically has a value of −0.97.

The output of pre-filtering stage 10, X, is input at the sampling rate into a bank of band pass filters $30_1, 30_2, \ldots 30_n$, having adjacent frequency bands. The number of bandpass filters and width of the frequency bands preferably are selected according to the application for the speech processing system. For example, a system useful in telephony applications preferably will employ about forty band pass filters having center frequencies approximately 100 Hz apart. For example, filter $30_1$ may have a center frequency of 50 Hz, filter $30_2$ may have a center frequency of 150 Hz, filter $30_3$ may have a center frequency of 250 Hz, and so on, so that the center frequency of filter $30_{40}$ is 3950 Hz. The bandwidth of each filter may be several hundred Hertz.

Blocks $40_{1-20}$ provide the complex conjugate of the output signal of band pass filter $30_1, 30_3, \ldots 30_{n-1}$. Multiplier blocks $42_{1-20}$ multiply the complex conjugates by the outputs of an adjacent higher frequency band pass filter $30_2, 30_4, 30_6, \ldots 30_{40}$ to provide output signals $Z_{1-20}$ at. Output signals $Z_{1-20}$ then are passed through a series of low pass filters $44_{1-20}$. The outputs of the low pass filters typically are generated only at the feature frame rate. For example, at a input speech sampling rate of 8 kHz, the output of the low pass filters is only computed at a feature frame rate of once every 10 msec.

Each output of low pass filters $44_{1-20}$ is a complex signal having real component R and imaginary component I. Blocks $46_{1-20}$ process the real and imaginary components of the low pass filter outputs to provide output signals $A_{1-20}$ and $F_{1-20}$ as shown in equations (1) and (2):

$$A_i = \log R_i \quad (1)$$

$$F_i = \frac{I_i}{\sqrt{R_i^2 + I_i^2}} \quad (2)$$

wherein $R_i$ and $I_i$ are the real and imaginary components of the corresponding low pass filter output. Output signals $A_i$ are a function of the amplitude of the low pass filter output and signals $F_i$ are a function of the frequency of the signal passed by the adjacent bandpass filters from which the low pass filter output was generated. By computing two sets of signals that are indicative of the amplitude and frequency of the input signal, the speech recognition system incorporating the speech feature extraction system of the present invention provides reduced error rate.

The amplitude and frequency signals $A_{1-20}$ and $F_{1-20}$ then are processed using conventional feature enhancement techniques in feature enhancement component 12b, using, for example, discrete cosine transform, melscale translation, mean normalization, delta and acceleration analysis, linear discriminant analysis and principal component analysis techniques that are per se known in the art. A preferred embodiment of a speech recognition system of the present invention incorporating the speech extraction system of the present invention employs a discrete cosine transform and delta features technique, as described hereinafter.

Still referring to FIG. 2, feature enhancement component 12b receives output signals $A_{1-20}$ and $F_{1-20}$, and processes those signals using discrete cosine transform (DCT) blocks 50 and 54, respectively. DCTs 50 and 54 attempt to diagonalize the co-variance matrix of signals $A_{1-20}$ and $F_{1-20}$. This helps to uncorrelate the features in output signals $B_{0-19}$ of DCT 50 and output signals $C_{0-19}$ of DCT 54. Each set of output signals $B_{0-19}$ and $C_{0-19}$ then are input into statistical processing stage 14. The function performed by DCT 50 on input signals $A_{1-20}$ to provide output signals $B_{0-19}$ is shown by equation (3), and the function performed by DCT 54 on input signals $F_{1-20}$ to provide output signals $C_{0-19}$ is shown by equation (4).

$$B_r = D(r) \sum_{n=0}^{N-1} A_{n+1} \cdot \cos \frac{(2n+1)\pi r}{2N} \quad (3)$$

$$C_r = D(r) \sum_{n=0}^{N-1} F_{n+1} \cdot \cos \frac{(2n+1)\pi r}{2N} \quad (4)$$

In equations (3) and (4), N equals the length of the input signal vectors A and F (e.g., N=20 in FIG. 2), n is an index from 0 to N−1 (e.g., n=0 to 19 in the embodiment of FIG. 2), and r is the index of output signals B and C (e.g., r=0 to 19 in the embodiment of FIG. 2). Thus, for each vector output signal $B_r$, each vector of input signals $A_{1-20}$ are multiplied by a cosine function and D(r) and summed together as shown in equation (3). For each vector output signal $C_r$, each vector of input signals $S_{1-20}$ are multiplied by a cosine function and D(r) and summed together as shown in equation (4). D(r) are coefficients that are given by the following equations:

$$D(r) = \frac{1}{\sqrt{N}} \text{ for } r = 0 \quad (5)$$

-continued $$D(r) = \frac{\sqrt{2}}{\sqrt{N}} \text{ for } r > 0 \quad (6)$$

Output signals $B_{0-19}$ and $C_{0-19}$ also are input into delta blocks 52 and 56, respectively. Each of delta blocks 52 and 56 takes the difference between measurements of feature vector values between consecutive feature frames and this difference may be used to enhance speech recognition performance. Several difference formulas may be used by delta blocks 52 and 56, as are known in the art. For example, delta blocks 52 and 56 may take the difference between two consecutive feature frames. The output signals of delta blocks 52 and 56 are input into statistical processing stage 14.

Energy stage 16 of FIG. 2 is a previously known technique for computing the logarithm of the total energy (represented by E) of each frame of input speech signal IN, according to the following equation:

$$E(nT) = \log\left(\frac{\sum_{i=0}^{K-1} IN_{(n-i)T}^2}{K}\right) \quad (7)$$

Equation 7 shows that energy block 16 takes the sum of the squares of the values of the input signal IN during the previous K sampling intervals (e.g., K=220, T=1/8000 seconds), divides the sum by K, and takes the logarithm of the final result. Energy block 16 performs this calculation every frame (e.g., 10 msec), and provides the result as an input to statistical processing block 14.

Figure 3:
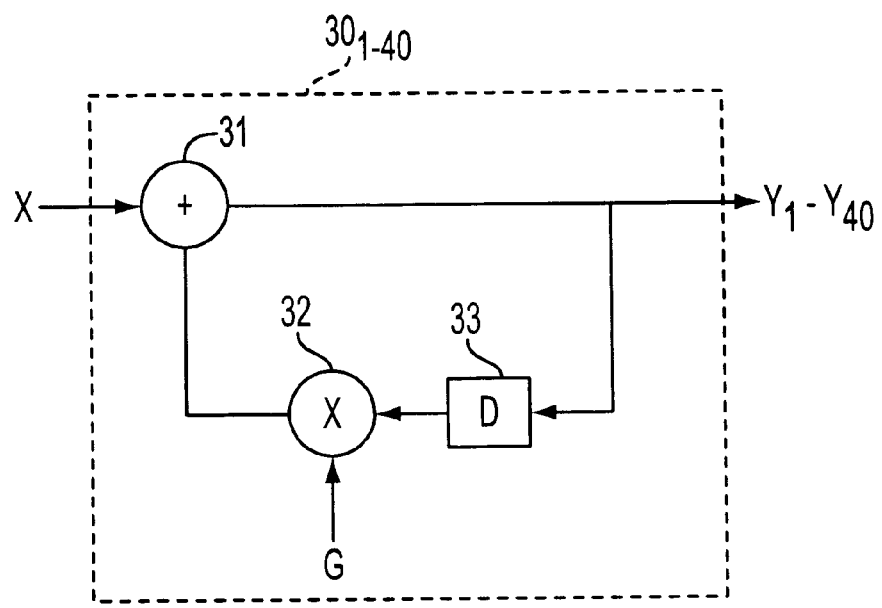
FIG. 3 is a detailed block diagram of a band pass filter suitable for implementing the feature extraction system of the present invention.

Referring now to FIG. 3, illustrative complex bandpass filter 30' suitable for use in the feature extraction system of the present invention is described. Filter 30' comprises adder 31, multiplier 32 and one-sample delay element 33. Multiplier 32 multiples the one-sample delayed output Y by complex coefficient G and the resultant is added to the input signal X to generate an output signal Y.

Figure 4:
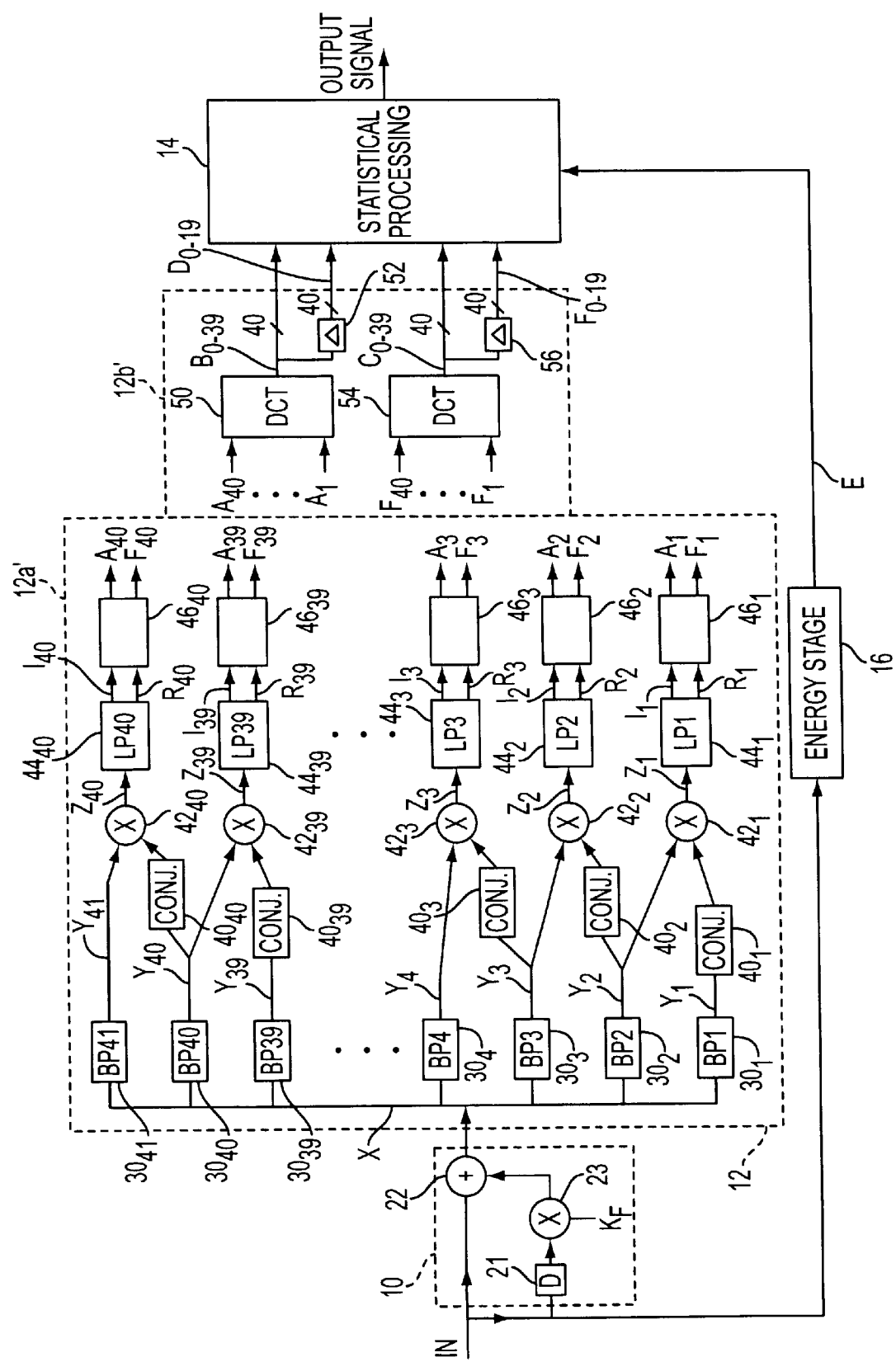
FIG. 4 is a detailed block diagram of an alternative embodiment of a speech recognition including an alternative speech feature extraction system of the present invention.

An alternative embodiment of the feature extraction system of the present invention is described with respect to FIG. 4. The embodiment of FIG. 4 is similar to the embodiment of FIG. 2 and includes prefiltering stage 10, statistical processing stage 14, and energy stage 16 the operate substantially as described above. However, the embodiment of FIG. 4 differs from the previously described embodiment in that feature extraction stage 12' includes additional circuitry within feature extraction system 12a, so that the feature vectors include additional information.

For example, feature extraction stage 12a' includes a bank of 41 band pass filters $30_{1-41}$ and conjugate blocks $40_{1-40}$. The output of each band pass filter is combined with the conjugate of the output of a lower adjacent band bass filter by multipliers $42_{1-40}$. Low pass filters $44_{1-40}$, and computation blocks $46_{1-40}$ compute vectors A and F as described above, except that the vectors have a length of forty elements instead of twenty. DCTs 50 and 54, and delta blocks 52 and 56 of feature enhancement component 12b' each accept the forty element input vectors and output forty element vectors to statistical processing block 14.

The present invention includes feature extraction stages which may include any number of band pass filters 30, depending upon the intended voice processing application, and corresponding numbers of conjugate blocks 40, multipliers 42, low pass filters 44 and blocks 46 to provide output signals A and F for each low pass filter. In addition, signals A and F may be combined in a weighted fashion, to generate melscale outputs, or only part of the signals may be used. For example, it may be advantageous to use only the amplitude signals in one frequency domain, and a combination of the amplitude and frequency signals in another. The foregoing therefore is merely illustrative of the principles of this invention and various modifications can be made by those skilled in the art without departing from the scope and spirit of the invention.

What is claimed is:

1. Apparatus for use in a speech processing system for extracting features from an input speech signal having frequency and amplitude characteristics, the apparatus comprising:
   first and second band pass filters adapted to receive the input speech signal and providing respectively, first and second signals;
   a conjugate circuit coupled to the second band pass filter and providing a third signal that is the conjugate of the second signal;
   a multiplier coupled to the first band pass filter and to the conjugate circuit and providing a fourth signal that is the product of the first and third signals; and
   filter means coupled to the multiplier for providing a fifth signal related to the frequency characteristics of the input signal, and a sixth signal related to amplitude characteristics of the input signal.

2. The apparatus of claim 1 wherein the filter means includes a low pass filter.

3. The apparatus of claim 2 wherein the low pass filter provides a signal having a real part, R, and an imaginary part, I, and the filter means includes circuitry for calculating:
   A=log R and
   F=I/Sqrt($R^2+I^2$).

4. The apparatus of claim 3 further comprising feature enhancement circuitry.

5. The apparatus of claim 4 further comprising circuitry for statistically processing an output of the feature enhancement circuitry to compare that output to a plurality of predetermined models.

6. The apparatus of claim 4 wherein the feature enhancement circuitry comprises circuitry for computing a discrete cosine transform of A and F.

7. The apparatus of claim 4 wherein the feature enhancement circuitry further comprises circuitry for calculating a difference between successive discrete cosine transforms of A and for calculating a difference between successive discrete cosine transforms of F.

8. The apparatus of claim 1 further comprising a high pass filter coupled between the input signal and the first and second band pass filters.

9. The apparatus of claim 1 wherein the first and second band pass filters each comprises a delay element, a complex multiplier and an adder.

10. The apparatus of claim 9 wherein the adder receives the input speech signals and outputs an output signal, the adder adding the input speech signal and a signal comprising a delayed sample of the output signal multiplied by the complex coefficient.

11. The apparatus of claim 1 further comprising:
   a transducer for converting sound into an electrical signal; and
   a sampler for converting the electrical signal into a digital signal, wherein the input speech signal comprises the digital signal.

12. The apparatus of claim 1 further comprising a digital processor, wherein the first and second band pass filters, the conjugate circuit, the multiplier, and the filter means comprise algorithms adapted to be executed on the digital processor.

13. A method for extracting features from an input speech signal for use in a speech processing device, the method comprising:
  separating the input signal into a first signal in a first frequency band and a second signal in a second frequency band;
  providing a conjugate of the first signal;
  multiplying the conjugate of the first signal with the second signal to provide a third signal; and
  processing the third signal to generate a frequency component related to frequency features in the input speech signal and an amplitude component related to amplitude features in the input speech signal.

14. The method of claim 13 further comprising high pass filtering the input speech signal prior to processing the input signal to generate the first and second signals.

15. The method of claim 13 wherein processing the third signal further comprises low pass filtering the third signal.

16. The method of claim 15 wherein low pass filtering the third signal provides a signal having a real part, R, and an imaginary part, I, and processing the third signal includes calculating:

A=log R and
F=I/Sqrt($R^2+I^2$).

17. The method of claim 16 further comprising processing the third signal using feature enhancement techniques to generate a series of feature vectors.

18. The method of claim 17 further comprising statistically processing the series of feature vectors by comparing the series of feature vectors to a plurality of predetermined models.

19. The method of claim 17 further comprising calculating a discrete cosine transform of A and F.

20. The method of claim 19 further comprising calculating a difference between successive discrete cosine transforms of A and between successive discrete cosine transforms of S.

21. The method of claim 20 further comprising statistically processing the differences between successive discrete cosine transforms to compare the differences to a plurality of predetermined patterns.

22. The method of claim 13 further comprising:
  converting a sound into an electrical signal; and
  sampling the electrical signal to provide a digital signal, wherein the input speech signal comprises the digital signal.

* * * * *